US008964751B2

(12) United States Patent
Anumala et al.

(10) Patent No.: US 8,964,751 B2
(45) Date of Patent: Feb. 24, 2015

(54) SYSTEM AND METHOD FOR STORING FLOW ENTRIES IN HARDWARE TABLES

(71) Applicant: Dell Products L.P., Round Rock, TX (US)

(72) Inventors: Mohnish Anumala, Cupertino, CA (US); Jeyasubramanian Irungolapillai, Chennai (IN)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 13/794,526

(22) Filed: Mar. 11, 2013

(65) Prior Publication Data

US 2014/0254605 A1    Sep. 11, 2014

(51) Int. Cl.
*H04L 12/28* (2006.01)
*H04L 12/721* (2013.01)

(52) U.S. Cl.
CPC ..................................... *H04L 45/38* (2013.01)
USPC ........................................... 370/392; 709/223

(58) Field of Classification Search
None
See application file for complete search history.

(56) References Cited

U.S. PATENT DOCUMENTS 8,345,688 B2 *   1/2013   Zhou et al. .................... 370/392
2007/0201458 A1 *   8/2007   Thron et al. .................. 370/389

* cited by examiner

*Primary Examiner* — Kevin C Harper
(74) *Attorney, Agent, or Firm* — Haynes and Boone, LLP

(57) ABSTRACT

A system and method for storing flow entries in hardware tables includes one or more controllers, memory, a first flow table for storing first flow entries, and a second flow table for storing second flow entries that override the first flow entries. The first flow table implements a fixed priority and the second flow table a flexible priority. The one or more controllers is configured to add a third flow entry with a first priority to the first table when the first priority is consistent with priorities of all overlapping first flow entries, move selected overlapping first flow entries to the second table and add the third flow entry to the first table when moving the selected first flow entries removes any priority inconsistencies in the first table when the third flow entry is added to the first table, and otherwise add the third flow entry to the second table.

20 Claims, 7 Drawing Sheets

Table T1 has fixed priority based on entry contents
Table T2 has flexible priority based on a priority field
Table T2 has more flexible matching (it can match packets Table T1 cannot)
Table T2 is searched after Table T1

| Rule | Criteria | Action |
|---|---|---|
| I | Only T2 can store and process | Add or replace in T2<br>Move all overlapping in T1 with higher priority to T2 |
| II | Both T1 and T2 can store and process | |
| II.A | New entry matches existing entry | |
| II.A.1 | P(new) = P(matched existing) | Replace |
| II.A.2 | P(new) ≠ P(matched existing) | Remove matched existing<br>Process with Rules II.B and II.C |
| II.B | No overlaps with existing entries | Add to T1 |
| II.C | Overlaps with existing entries | |
| II.C.1 | P(new) ≥ P(any overlapping in T2) | Add to T2 |
| II.C.2 | P(new) < P(all overlapping in T2) | |
| II.C.2.a | P(new) consistent with fixed P(all overlapped in T1) | Add to T1 |
| II.C.2.b | P(new) not consistent with fixed P(all overlapped in T1);<br>P(new) > P(all overlapped in T1) | Add to T2 |
| II.C.2.c | P(new) not consistent with fixed P(some overlapped in T1) | Move all inconsistent in T1 to T2<br>Add to T1 |

FIG. 4

L3 Table 610

| Entry | Priority |
|---|---|
| 1.2.3.* | B |
| 1.*.*.* | C |

Note: B > C

FP Table 620

| Entry | Priority |
|---|---|
| 1.2.3.*; Port 80 | A |

Note: A > B

| Case | New Flow Entry | Rule | Action |
|---|---|---|---|
| 630 | 1.2.*.* Priority D; D ≥ A | II.C.1 | Add to FP |
| 640 | 1.2.*.* Priority D; A > D > B > C | II.C.2.c | Move 1.2.3.* to FP<br>Add to L3 |
| 650 | 1.2.*.* Priority D; A > B > D > C | II.C.2.a | Add to L3 |
| 660 | 1.2.*.* Priority D; A > B > C > D | II.C.2.c | Move 1.2.3.* to FP<br>Move 1.*.*.* to FP<br>Add to L3 |
| 670 | 1.2.3.4 Priority D; A > B > C > D | II.C.2.c | Move 1.2.3.* to FP<br>Move 1.*.*.* to FP<br>Add to L3 |

*FIG. 6A*

L3 Table 680

| Entry | Priority |
|-------|----------|
| 1.2.3.4 | B |
| 1.2.*.* | C |

Note: B > C

| Case | New Flow Entry | Rule | Action |
|------|----------------|------|--------|
| 690 | 1.*.*.* Priority D; D > B > C | II.C.2.b | Add to FP |

*FIG. 6B*

SYSTEM AND METHOD FOR STORING FLOW ENTRIES IN HARDWARE TABLES

BACKGROUND

The present disclosure relates generally to information handling systems, and more particularly to storing flow entries in hardware tables.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding and/or flow processing information as network configurations change.

Accordingly, it would be desirable to provide improved network switching products that can store forwarding and/or flow processing information effectively.

SUMMARY

According to one embodiment, a network device includes one or more controllers for controlling the network device, memory coupled to the one or more controllers, a first flow table for storing first flow entries, and a second flow table for storing second flow entries. The first flow table implements a fixed priority. The second flow entries override the first flow entries. The second flow table implements a flexible priority and is capable of storing the first flow entries. The one or more controllers is configured to add a third flow entry with a first priority to the first table when the first priority is consistent with priorities of all first flow entries that overlap the third flow entry, move selected first flow entries that overlap the third flow entry to the second table and add the third flow entry to the first table when moving the selected first flow entries removes any priority inconsistencies in the first table when the third flow entry is added to the first table, and otherwise add the third flow entry to the second table.

According to another embodiment, a method of adding a flow entry includes adding a first flow entry with a first priority to a first table storing second flow entries when the first priority is consistent with priorities of all second flow entries that overlap the first flow entry, moving selected second flow entries that overlap the first flow entry to a second table storing third flow entries and adding the first flow entry to the first table when moving the selected second flow entries removes any priority inconsistencies in the first table when the first flow entry is added to the first table, and otherwise adding the first flow entry to the second table. The first flow table implements a fixed priority. The second flow table implements a flexible priority. The third flow entries override the second flow entries. The second table is capable of storing the second flow entries.

According to yet another embodiment, an information handling system includes a network device, one or more controllers for controlling the network device, memory coupled to the one or more controllers, a first flow table for storing first flow entries, and a second flow table for storing second flow entries. The first flow table implements a fixed priority. The second flow entries override the first flow entries. The second flow table implements a flexible priority and is capable of storing the first flow entries. The one or more controllers is configured to add a third flow entry with a first priority to the first table when the first priority is consistent with priorities of all first flow entries that overlap the third flow entry, move selected first flow entries that overlap the third flow entry to the second table and add the third flow entry to the first table when moving the selected first flow entries removes any priority inconsistencies in the first table when the third flow entry is added to the first table, and otherwise add the third flow entry to the second table.

BRIEF DESCRIPTION OF THE DRAWINGS

FIG. 4 is a simplified diagram of rules for adding flow entries to the flow processing data structure architecture of FIG. 3 according to some embodiments.

FIGS. 6A and 6B are simplified diagrams of examples of application of the rules for adding flow entries from FIG. 4 according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Fast and efficient forwarding of network traffic by an IHS and/or a network switching unit is an important feature of most networks. In order to keep track of forwarding paths, forwarding instructions, and/or other forwarding and flow processing information, a network switching unit may store use one or more flow processing data structures.

Figure 1:
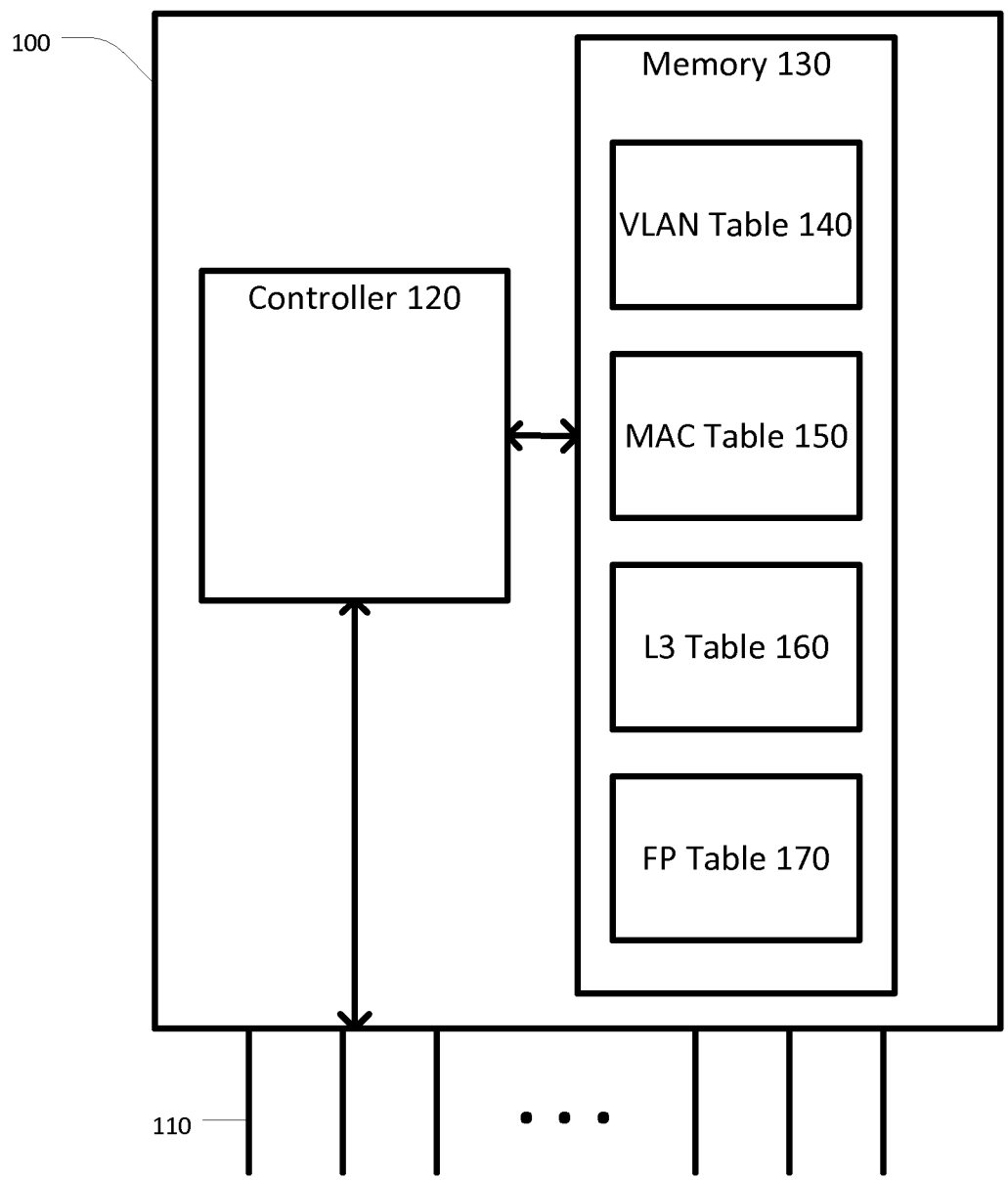
FIG. 1 is a simplified diagram of a network device according to some embodiments.

FIG. 1 is a simplified diagram of a network device 100 according to some embodiments. As shown in FIG. 1, the network device 100 may be coupled to other network devices using one or more network links 110. In some examples, the network device 100 may be a network switching unit. In some examples, the network device 100 may be a router. The network device 100 includes a controller 120 and memory 130. According to some embodiments, the controller 120 may be used to make forwarding and/or other flow processing decisions for network traffic being handled by the network device 100. According to some embodiments, the controller 120 may use one or more protocols to communicate with the other network devices using the one or more network links 110. According to some embodiments, the controller 120 may include one or more processors. The memory 130 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

The network device 100 may further include one or more flow processing data structures. In some examples, the one or more flow processing data structures may include a VLAN table 140. The VLAN table 140 may include one or more entries relating VLAN IDs to forwarding information and/or processing instructions for network traffic associated with respective VLAN IDs. In some examples, the VLAN table 140 may be stored in the memory 130. In some examples, one or more of the VLAN IDs in the VLAN table 140 may be identified using one or more wildcards so that a corresponding table entry may be associated with more than one VLAN ID. In some examples, the one or more flow processing data structures may include a media access control (MAC) table 150. The MAC table 150 may include one or more entries relating MAC addresses to forwarding information and/or processing instructions for network traffic associated with respective MAC addresses. In some examples, the MAC table 150 may be stored in the memory 130. In some examples, one or more of the MAC addresses in the MAC table 150 may be identified using one or more wildcards so that a corresponding table entry may be associated with more than one MAC address. In some examples, the one or more flow processing data structures may include a layer 3 (L3) table 160. The L3 table 160 may include one or more entries relating Internet Protocol (IP) addresses to forwarding information and/or processing instructions for network traffic associated with respective IP addresses. In some examples, the L3 table 160 may be stored in the memory 130. In some examples, one or more of the IP addresses in the L3 table 160 may be identified using one or more wildcards so that a corresponding table entry may be associated with more than one L3 address.

According to some embodiments, one or more of the VLAN table 140, the MAC table 150, and/or the L3 table 160 may be stored in a content addressable memory. The use of content addressable memory may support fast searching of the respective tables even though they contain a large number of entries. In some examples, the VLAN table 140, the MAC table 150, and/or the L3 table 160 may be preferred for the storage of forwarding information and/or processing instructions because of their high capacity and/or fast searching properties. In some examples, the VLAN table 140, the MAC table 150, and/or the L3 table may be implemented as hardware tables. According to some embodiments, the VLAN table 140, the MAC table 150, and/or the L3 table 160 may provide limited support for priority among the respective entries. In some examples, the priority of the respective entries may be fixed based on a content of the respective entries. In some examples, entries in the L3 table 160 may be based on corresponding IP address values. In some examples, the L3 table 160 may provide priority to entries having a more specific IP address. In some examples, the L3 table 160 may assign a higher priority to an IP address of 1.2.3.* over an IP address of 1.2.*.*, where * is a wildcard, because the IP address 1.2.3.* is more specific (i.e., has fewer wildcards) than the IP address 1.2.*.*. In some examples, priority conflicts in the L3 table may be avoided by limiting wildcards to only lowest significant bits of IP addresses as is common with IP subnet masks.

According to some embodiments, the one or more flow processing data structures may include a flow processing (FP) table 170. In some examples, the FP table 170 may be an access control list (ACL). In some examples, the FP table 170 may provide for more flexible identification of forwarding information and/or processing instructions. In some examples, the FP table 170 may be used to identify one or more flows in network traffic. In some example, the FP table 170 may identify the one or more flows based on combinations of VLAN IDs, MAC addresses, IP addresses, and/or other flow identification fields. In some examples, the other flow identification fields may correspond to one or more fields found in packets of network traffic. In some examples, the other flow identification fields may include one or more selected from a group consisting of TCP/UDP ports, quality of service (QoS), and the like. In some examples, entries in the FP table 170 may use wildcards to identify flows. In some examples, entries in the FP table 170 may be associated with flexible priorities. In some embodiments, the FP table 170 may be used to provide flexible flow management and control in the OpenFlow architecture. In some examples, FP table 170 may be stored in the memory 130.

According to some embodiments, the FP table 170 may not be as efficient as the VLAN table 140, the MAC table 150, and/or the L3 table 160 for storing and accessing forwarding information and/or processing instructions. In some examples, the flexible flow identification and/or priority of the FP table 170 may prevent the FP table 170 from being stored in a content addressable memory. In some examples, the FP table 170 may not be searchable as quickly as the VLAN table 140, the MAC table 150, and/or the L3 table 160. In some examples, the FP table 170 may be limited in size.

As discussed above and further emphasized here, FIG. 1 is merely an example, which should not unduly limit the scope of the claims. One of ordinary skill in the art would recognize may variations, alternatives, and modifications. According to some embodiments, other architectures are possible for the network device 100. In some examples, the VLAN table 140, the MAC table 150, the L3 table 160 and/or the FP table 170 may each be stored in different memories. In some examples, one or more of the VLAN table 140, the MAC table 150, the L3 table 160, and/or the FP table 170 may be omitted. In some examples, the VLAN table 140, the MAC table 150, the L3 table 160, and/or the FP table 170 may be stored outside the network device 100. In some examples, some or all of the memory 130 may be included in the controller 120.

Figure 2:
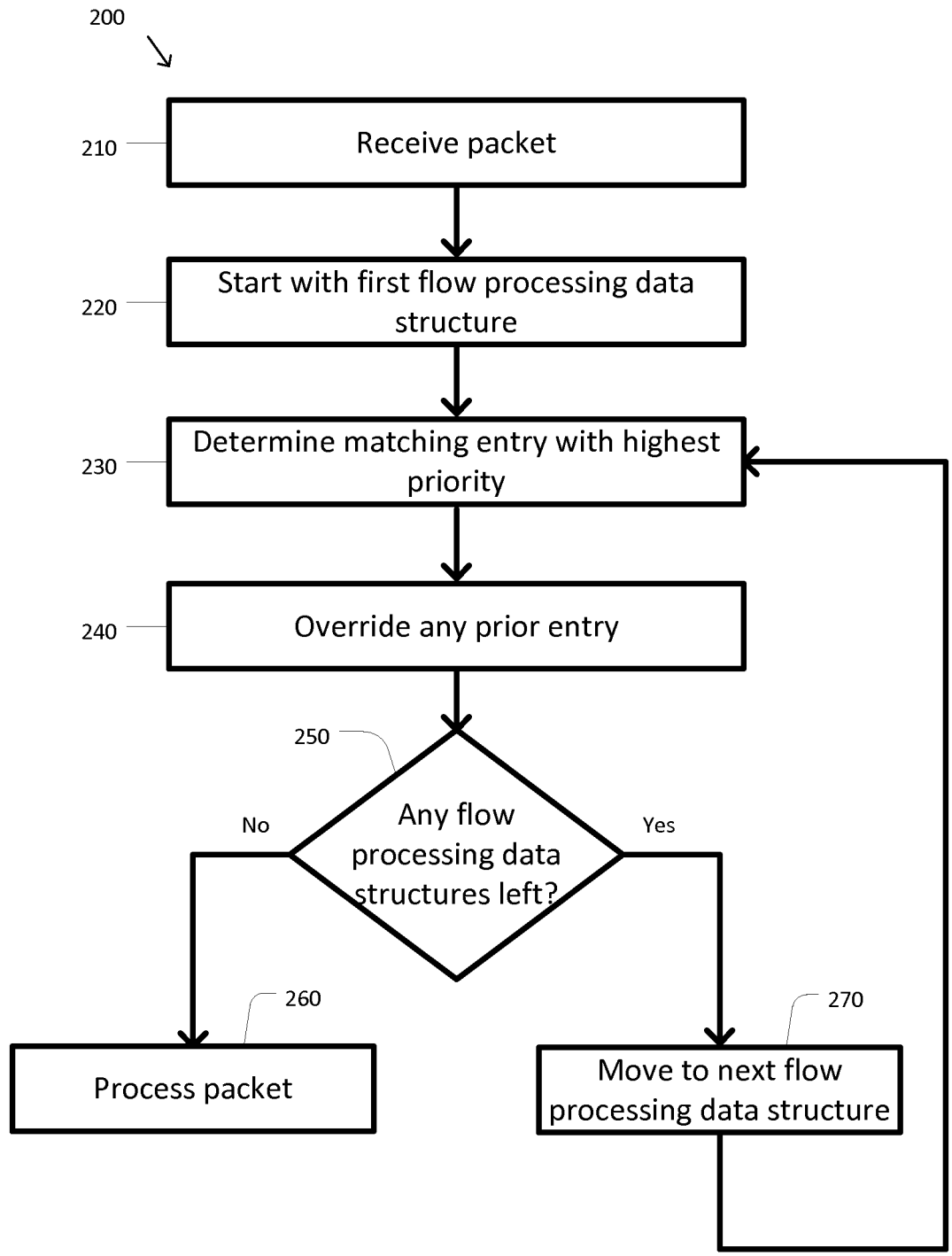
FIG. 2 is a simplified diagram of a method of flow processing according to some embodiments.

FIG. 2 is a simplified diagram of a method 200 of flow processing according to some embodiments. As shown in FIG. 2, the method 200 includes a process 210 for receiving a packet; a process 220 for starting with a first data structure; a process 230 for determining a matching entry with a highest priority, a process 240 for overriding any prior entry; a process 250 for determining whether any data structures are left, a process 260 for processing the packet; and a process 270 for moving to a next data structure. According to certain embodiments, the method 200 of flow processing can be performed using variations among the processes 210-270 as would be recognized by one of ordinary skill in the art. In some embodiments, one or more of the processes 210-270 of method 200 may be implemented, at least in part, in the form of executable code stored on non-transient, tangible, machine readable media that when run by one or more processors (e.g., one or more processors in the controller 120) may cause the one or more processors to perform one or more of the processes 210-270.

At the process 210, a packet is received. In some examples, the packet may be one of one or more packets associated with a flow of network traffic. In some examples, the packet may include one or more fields that may be used to determine how the packet should be forwarded and/or processed.

At the process 220, processing begins with a first data structure. In some examples, when a network switching unit (e.g., the network device 100) includes more than one flow processing data structure, a search through the flow processing data structures may begin with a first flow processing data structure. In some examples, the first flow processing data structure may have the lowest priority among the flow processing data structures. In some examples, a VLAN table (e.g., the VLAN table 140) may be the first flow processing data structure. In some examples, the first flow processing data structure becomes a current flow processing data structure to be used during the process 230.

At the process 230, a matching entry with a highest priority is determined. In some examples, the current flow processing data structure may be searched to determine whether the current flow processing data structure includes any entries that match the one or more fields in the packet. In some examples, when more than one entry in the current flow processing data structure matches the one or more fields in the packet, the matching entry with the highest priority is determined. In some examples, when the current flow processing data structure is a L3 table, a destination IP address field in the packet may be used to determine the matching entry with the highest priority. In some examples, when the packet includes a destination IP address of 1.2.3.5, the destination IP address 1.2.3.5 would match L3 table entries of 1.2.3.5, 1.2.3.*, 1.2.*.*., and 1.*.*.*, but would not match 1.2.4.*. In some examples, the L3 table entry 1.2.3.5 would be determined to be the matching entry with the highest priority because it is the most specific entry in the table. Similarly, the remaining entries in descending order of priority are 1.2.3.*, 1.2.*.*, and 1.*.*.*. In some examples, when there are no matching entries, the method 200 may proceed to process 250 to determine whether any flow processing data structure are left to be searched.

At the process 240, any prior entry would be overridden. In some examples, the flow processing data structures may be searched in an order so that a lowest priority flow processing data structure (i.e., the first flow processing data structure) is searched first, followed by any remaining flow processing data structures in order to a highest priority flow processing data structure. In some examples, this permits entries in higher priority flow processing data structures to override entries in lower priority flow processing data structures. In some examples, a priority order for the flow processing data structures of FIG. 1 from lowest priority to highest is the VLAN table 140, the MAC table 150, the L3 table 160, and the FP table 170. In some examples, an L3 table entry would override a MAC table entry. Thus, the matching entry with the highest priority determined during a later application of the process 230 overrides the matching entry with the highest priority determined during an earlier application of the process 230. In some examples, any forwarding information and/or processing instructions from the entry determined during the most recent process 230 override any forwarding information and/or processing instructions for the packet. When there is no prior entry, the entry determined during the most recent process 230 becomes the forwarding information and/or processing instructions for the packet.

At the process 250, it is determined whether any flow processing data structures are left. When no further flow processing data structures are left to be searched, the packet may be processed using the process 260. When further flow processing data structures are left to be searched, the search moves to the next flow processing data structure using the process 270.

At the process 260, the packet is processed. In some examples, the packet may be processed using the forwarding information and/or processing instructions determined during the processes 230 and 240. In some examples, when the forwarding information and/or processing instructions provide a next hop for the packet, the packet may be queued for forwarding using the next hop.

At the process 270, searching is moved to the next flow processing data structure. The next flow processing data structure may then be searched for matching entries using the process 230.

Figure 3:
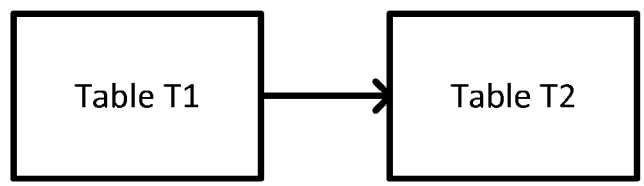
FIG. 3 is a simplified diagram of a flow processing data structure architecture according to some embodiments.

FIG. 3 is a simplified diagram of a flow processing data structure architecture according to some embodiments. As shown in FIG. 3 the flow processing data structure architecture includes a table T1 and a table T2. Table T1 includes one or more entries that are processed using a fixed priority where the fixed priority is based on contents of the respective table entry. In some examples, when table T1 is an L3 table, the fixed priority includes giving a higher priority to more specific IP address entries.

Table T2 includes one or more entries that are processed using a flexible priority. In some examples, the flexible priority may be based on a priority field included in each of the one or more entries. In some examples, table T2 may include entries with corresponding priorities that are different from the fixed priority of table T1. In some examples, when table T2 includes entries based on IP addresses, table T2 may assign a higher priority to an IP address entry of 1.2.*.* than an entry with an IP address entry of 1.2.3.* even though this priority is different than the fixed priority that may be assigned when table T1 is a L3 table. According to some embodiments, table T2 may be a FP table (e.g., the FP table 170).

Table T2 includes more flexible matching than table T1. In some examples, when process 230 is applied to table T2, process 230 may consider more flow identification fields than the corresponding process for table T1. Table T2 is able to store and process any entry that table T1 is able to store and process, however, table T1 may not be able to store and process every entry that table T2 is able to store and process. In some examples, when table T2 is a FP table and table T1 is a L3 table, table T2 may store an entry associated with IP address 1.2.*.* and TCP/UDP ports 80-85, but table T1 may not store the entry because table T1 may only store entries based on IP addresses.

Table T2 is searched after table T1. In some examples, during the method 200, table T2 is searched during a later application of the process 230 than table T1. This means that table T2 has a higher priority than table T1 because any matching entry in table T1 would be overridden by any matching entry in table T2 during the process 240. As a consequence, any entry in table T2 should have a higher priority than any overlapping entry in table T1. In some examples, when table T2 includes an entry for IP address 1.2.*.* and TCP/UDP ports 80-85 and table T1 includes an entry for IP address 1.2.3.*, the table T2 entry must have a higher priority. This avoids a problem where the later matching to the table T2 entry overrides the table T1 entry with a higher assigned priority (i.e., where the priority of the entries requires that the flow processing for the IP address 1.2.3.* in table T1 be given priority over the flow processing for IP address 1.2.*.* and ports 80-85). In some examples, in order to solve this potential priority conflict, both of the entries may be placed in table T2 due to its flexible priority.

This, however, may not be the best solution to the problem in all cases. In some embodiments when table T2 is a FP table and table T1 is a L3 table, it may be advantageous to keep as many entries as possible in the L3 table. In some examples, this permits faster searches of all the entries. In some examples, this puts table entries in the L3 table, which may store more entries. Accordingly, it would be advantageous to place as many entries as possible in table T1 without interfering with the specified priority of the entries in both table T1 and table T2.

FIG. 4 is a simplified diagram of rules for adding flow entries to the flow processing data structure architecture of FIG. 3 according to some embodiments. As shown in FIG. 4, a hierarchy of rules and/or decisions are required to determine an action when a new flow entry is to be added to the flow processing data structures. The action may be used to determine the changes which should be made to the flow processing data structures. Each of the rules/decisions of FIG. 4 should be processed in order to ensure that the new flow entry is properly added to the flow processing data structures and the priority of the entries is properly maintained. When a rule from FIG. 4 does not include an action this means that a further rule in the rule hierarchy must be used to determine the correct action. For example, when the new entry matches an existing entry (rule II.A), rules II.A.1 and II.A.2 should be consulted to determine the necessary action. According to some embodiments, the rules of FIG. 4 may be implemented as a method.

At rule I, it is determined whether the new flow entry can only be stored and processed by table T2. When the new flow entry can only be stored and processed by table T2 it should be added to table T2 or should replace a matching entry in table T2. In some examples, when table T2 is a FP table and table T1 is a L3 table, a new entry for IP address 1.2.*.* and TCP/UDP ports 80-85 can only be stored and processed in table T2 and should be added or replaced there. When the new flow entry also has a lower priority than one or more overlapping flow entries in table T1, each of the one or more higher priority overlapping entries in table T1 should also be moved to table T2. For example, if the new entry for IP address 1.2.*.* and TCP/UDP ports 80-85 has a lower priority than an entry for IP address 1.*.*.* in the L3 table (table T1), the 1.*.*.* entry should be moved to the FP table (table T2) so that the higher priority 1.*.*.* entry is not overridden by the lower priority 1.2.*.* ports 80-85 entry.

At rule II, it is determined that the new flow entry can be stored and processed in both tables T1 and T2. When the new flow entry can be stored and processed in both tables T1 and T2, further rules must be evaluated to determine the desired action.

At rule II.A, it is determined whether the new flow entry matches an existing flow entry. When the new flow entry uses a same matching criteria as an existing (i.e., previously stored) entry, rules II.A.1 and II.A.2 should be used to determine the desired action.

At rule II.A.1 it is determined whether a priority of the new flow entry is the same as a priority of the matched existing flow entry. When the priority of the new flow entry is the same as the priority of the matched existing entry, the matched existing entry may be replaced by the new flow entry. This is possible because there is no change in any of the flow entry priorities.

At rule II.A.2, it is determined that the priority of the new flow entry is different from the priority of the matched existing flow entry. When the priority of the new flow entry is different from the priority of the matched existing entry, the matched existing entry should be removed from the flow processing data structures. This should occur whether the matched existing entry is stored in table T1 or table T2. Once the matched existing entry is removed, the new flow entry should be processed using rules II.B and II.C.

At rule II.B, it is determined whether the new flow entry overlaps with any existing flow entries. In some examples, when the new flow entry is IP address 1.2.*.* it would overlap existing flow entries of 1.*.*.*, 1.2.3.*, 1.2.3.4, and 1.2.3.* with TCP/UDP ports 80-85. When it is determined that there are no overlaps between the new flow entry and any existing flow entries, the new flow entry may be added to table T1. This is because the new flow entry cannot create any priority inconsistencies with existing entries.

At rule II.C, it is determined that the new flow entry overlaps one or more existing flow entries. Because of the overlap, rules II.C.1 and II.C.2 should be used to determine the desired action so as to prevent any priority inconsistencies when the new flow entry is added to one of the tables.

At rule II.C.1, it is determined whether the priority of the new flow entry is greater than or equal to a priority of any of the overlapping entries stored in table T2. When the new flow entry has a higher or same priority than the overlapping entries stored in table T2, the new flow entry should be stored in table T2 so that it can be given the higher priority. In some examples, when the priority of the new flow entry and the priority of an overlapping entry in table T2 are the same, a tie breaking procedure may be required to select between the entries when they are matched during the process 230. According to some embodiments, flow entries without wildcards may only be assigned a highest priority and would be added to table T2 under rule II.C.1.

At rule II.C.2 it is determined that the priority of the new flow entry is lower than the priority of all the overlapping entries in table T2. When the priority of the new flow entry is lower than the priority of all the overlapping entries in table T2, rules II.C.2a-II.C.2.c should be used to determine the desired action so as to prevent any priority inconsistencies when the new flow entry is added to one of the tables.

At rule II.C.2.a, it is determined whether the priority of the new flow entry is consistent with a fixed priority of all of the overlapped entries in table T1. When the priority of the new flow entry is consistent with the fixed priority of all of the overlapped entries in table T1, the new flow entry may be added to table T1 while still maintaining the desired priority among the flow entries.

At rule II.C.2.b, it is determined whether the priority of the new flow entry is not consistent with the fixed priority of all the overlapped entries in table T1 and whether the priority of the new flow entry is greater than a priority of all the overlapped entries in table T1. When the priority of the new flow is not consistent with the fixed priority of all the overlapped entries in table T1 and the priority of the new flow entry is greater than the priority of all the overlapped entries in table T1, the new flow entry should be added to table T2 to implement the priority of the new flow entry.

At rule II.C.2.c, it is determined that the priority of the new flow entry is not consistent with the fixed priority of some of the overlapped entries in table T1. When the priority of the new flow entry is not consistent with the fixed priority of some of the overlapped entries in table T1 this means that the priority among the overlapped entries in table T1 may be implemented by moving the inconsistent overlapped entries from table T1 to table T2 and adding the new flow entry to table T1. This approach may keep the largest number of flow entries in table T1 while still implementing the desired priorities.

Use of rule II.C-II.C.2.c to process new flow entries may be found in the examples of FIGS. 6A and 6B.

Figure 5:
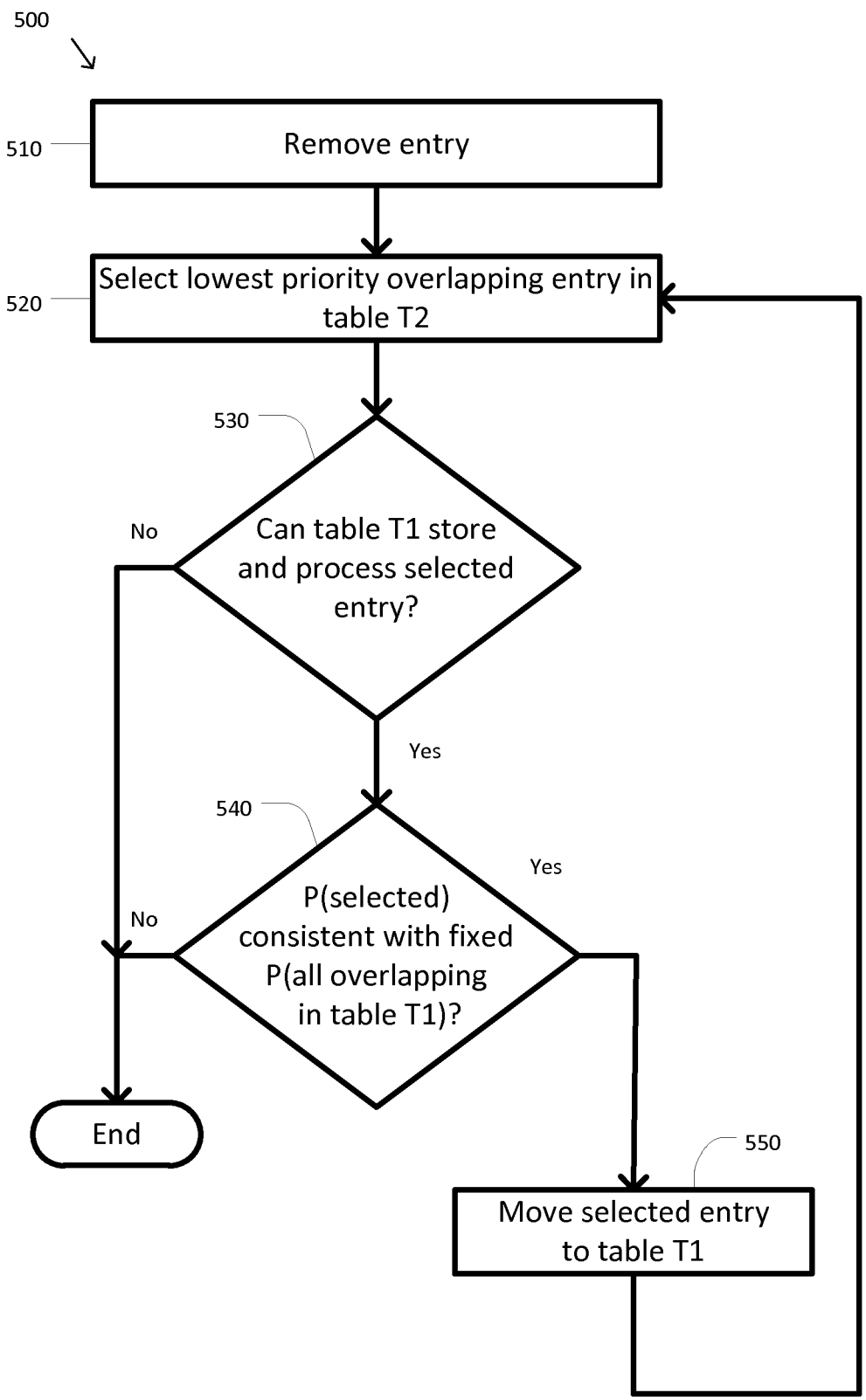
FIG. 5 is a simplified diagram of a method of flow entry removal in the flow processing data structure architecture of FIG. 3 according to some embodiments.

FIG. 5 is a simplified diagram of a method 500 of flow entry removal in the flow processing data structure architecture of FIG. 3 according to some embodiments. As shown in FIG. 5, the method 500 includes a process 510 for removing a flow entry, a process 520 for selecting a lowest priority overlapping entry in table T2, a process 530 for determining whether table T1 can store and process the selected entry, a process 540 for determining whether the priority of the selected entry is consistent with the fixed priority of all the overlapping entries in table T1, and a process 550 for moving the selected entry to table T1. According to certain embodiments, the method 500 of flow entry removal can be performed using variations among the processes 510-550 as would be recognized by one of ordinary skill in the art. In some embodiments, one or more of the processes 510-550 of method 500 may be implemented, at least in part, in the form of executable code stored on non-transient, tangible, machine readable media that when run by one or more processors (e.g., one or more processors in the controller 120) may cause the one or more processors to perform one or more of the processes 510-550.

At the process 510, a flow entry is removed. The flow entry is removed from the flow processing data structure in which it is stored. In some examples, the flow entry may be removed from table T1. In some examples, the flow entry may be removed from table T2. In some examples, removal of the flow entry from the corresponding flow processing data structure may be sufficient to keep the flow entry from being used for flow processing, however, other changes to the flow processing data structures may also be possible.

At the process 520, a lowest priority overlapping flow entry in table T2 is selected. In a fashion complementary to the rules for adding flow entries in FIG. 4 (e.g., rule II.C.2, etc.), it may be possible to move to table T1 the lowest priority entry in table T2 that overlaps with the flow entry removed during the process 510.

At the process 530, it is determined whether table T1 can store and process the selected entry. When table T1 can store and process the selected entry, the selected entry may be considered for movement to table T1 using the processes 540 and 550. When table T1 cannot store and process the selected entry, the method 500 may end.

At the process 540, it is determined whether the priority of the selected entry is consistent with the fixed priority of all overlapping entries in table T1. In some examples, the selected entry may only be moved to table T1 when moving the selected entry to table T1 does not create any inconsistencies in priority. In some examples, this requires that the priority of the selected entry cannot conflict with the fixed priority of table T1. In some examples, this may require consideration of the priority of the selected entry, the fixed priority of table T1, and the priorities of any entries in table T1 that overlap with the selected entry. When the priority of the selected entry is not consistent with the fixed priority of all the overlapping entries in table T1 the method 500 may end. When the priority of the selected entry is consistent with the fixed priority of all the overlapping entries in table T1, the selected entry may be moved to table T1 using the process 550.

At the process 550, the selected entry may be moved to table T1. The selected entry may be removed from table T2 and then added to table T1. After the selected entry is moved to table T1, the method 500 returns to the process 520 to determine whether any additional entries may be moved to table T1.

FIGS. 6A and 6B are simplified diagrams of examples of application of the rules for adding flow entries from FIG. 4 according to some embodiments. As shown in FIG. 6A, table T1 is a L3 table 610 and table T2 is a FP table 620. For the purposes of the examples of FIG. 6A, the L3 table 610 includes two flow entries and the FP table 620 includes one flow entry, although the L3 table 610 and/or the FP table 620 may include many more entries. A first entry in the L3 table 610 is associated with the IP address pattern 1.2.3.* and is assigned a priority of B. A second entry in the L3 table 610 is associated with the IP address pattern 1.*.*.* and is assigned a priority of C. Because of the fixed priority of the L3 table 610, B is a higher priority than C. This is because searches of the L3 table 610 assign a higher priority to more specific IP address patterns and prior application of the rules of FIG. 4 (e.g., rules II.C.2.b and II.C.2.c depending upon the order in which the two entries were added) would not allow both entries to be stored in the L3 table 610 if the priorities were reversed due to the priority inconsistency it would cause. The entry in the FP table 620 is associated with the IP address pattern 1.2.3.* and the TCP/UDP port 80 and is assigned a priority of A. This entry must appear in the FP table 620 because it cannot be stored and processed by the L3 table 610 due to the port 80 requirement. The priority A is also a higher priority than both B and C, otherwise it would be possible for a lower priority entry in the FP table 620 to improperly override a higher priority entry in the L3 table 610. FIG. 6A further shows several cases 630-670 of actions that result from adding different new flow entries.

In case 630, a new flow entry associated with the IP address pattern 1.2.*.* with an assigned priority of D is to be added where the priority D is a higher priority than A. In case 630, the rule II.C.1 is controlling. The 1.2.*.* IP address pattern overlaps with both the L3 table 610 and FP table 620 entries. Because priority D is higher than priority A rule II.C.1 is applied. Rule II.C.1 ensures that the new entry is not added to table T1 because that would create a case where the lower priority entry in the FP table 620 could override the higher priority new entry. Consequently, the new entry should be added to the FP table 620 so that its higher priority may be ensured.

In case 640, a new flow entry associated with the IP address pattern 1.2.*.* with an assigned priority of D is to be added where the priority D is a lower priority than A, but a higher priority than B. In case 640, the rule II.C.2.c is controlling. The 1.2.*.* IP address pattern overlaps with both the L3 table 610 and FP table 620 entries. Because priority D is lower than priority A, the new entry is a potential candidate for the L3 table 610. Simply adding the new 1.2.*.* entry to the L3 table 610 is not possible because the 1.2.*.* pattern has a lower priority than the 1.2.3.* pattern under the fixed priority rules of the L3 table 610 that assigns a higher priority to the more specific 1.2.3.* pattern. However, if the 1.2.3.* entry is moved to the FP table 620, the new 1.2.*.* entry may be added to the L3 table 610 without creating any inconsistencies with the lower priority 1.*.*.* entry that remains in the L3 table 610. No inconsistencies are created in the FP table 620 by moving the 1.2.3.* entry because the FP table 620 does not use fixed priority.

In case 650, a new flow entry associated with the IP address pattern 1.2.*.* with an assigned priority of D is to be added where the priority D is a lower priority than A and B, but a higher priority than C. In case 650, the rule II.C.2.a is controlling. The 1.2.*.* IP address pattern overlaps with both the L3 table 610 and FP table 620 entries. Because priority D is lower than priority A, the new entry is a potential candidate for the L3 table 610. The new 1.2.*.* entry may be added to the L3 table 610 because the 1.2.*.* pattern has a lower priority than the 1.2.3.* pattern and a higher priority than the 1.*.*.* pattern under the fixed priority rules of the L3 table 610. This is fully consistent with the desired priority between D, B, and C.

In case 660, a new flow entry associated with the IP address pattern 1.2.*.* with an assigned priority of D is to be added where the priority D is a lower priority than A, B, and C. In case 660, the rule II.C.2.c is controlling. The 1.2.*.* IP address pattern overlaps with both the L3 table 610 and FP table 620 entries. Because priority D is lower than priority A, the new entry is a potential candidate for the L3 table 610. Simply adding the new 1.2.*.* entry to the L3 table 610 is not possible because the 1.2.*.* pattern has a higher priority than the 1.*.*.* pattern under the fixed priority rules of the L3 table 610. If the 1.*.*.* entry is moved to the FP table 620, this would resolve any conflicts between the new 1.2.*.* entry and the 1.*.*.* entry because with the 1.*.*.* entry in the FP table 620, the 1.*.*.* entry could override the new 1.2.*.* entry if it were in the L3 table 610. But this would also create a conflict with the 1.2.3.* entry remaining in the L3 table, so the 1.2.3.* entry should also be moved to the FP table 620. With both of the higher priority 1.2.3.* and 1.*.*.* entries moved to the FP table 620, the new 1.2.*.* entry may be added to the L3 table In case 670, a new flow entry associated with the IP address pattern 1.2.3.4 with an assigned priority of D is to be added where the priority D is a lower priority than A, B, and C. According to some embodiments, the example of case 670 is not possible where entries without wildcards are always assigned a highest priority. Assuming that the priority relationship of case 670 is possible, the rule II.C.2.c is controlling. The 1.2.3.4 IP address pattern overlaps with both the L3 table 610 and FP table 620 entries. Because priority D is lower than priority A, the new entry is a potential candidate for the L3 table 610. Simply adding the new 1.2.3.4 entry to the L3 table 610 is not possible because the 1.2.3.4 pattern has a higher priority than both the 1.2.3.* and the 1.*.*.* patterns under the fixed priority rules of the L3 table 610. However, if both the 1.2.3.* and 1.*.*.* entries are moved to the FP table 620, this would resolve any conflicts between the new 1.2.3.4 entry and both the 1.2.3.* and the 1.*.*.* entries because with both the 1.2.3.* and the 1.*.*.* entries in the FP table 620, they could override the new 1.2.3.4 entry if it were in the L3 table 610. With both of the higher priority 1.2.3.* and 1.*.*.* entries moved to the FP table 620, the new 1.2.3.4 entry may be added to the L3 table.

As shown in FIG. 6B, table T1 is a L3 table 680. For the purposes of the examples of FIG. 6B, the L3 table 680 includes two flow entries, although the L3 table 680 may also include many more entries. A first entry in the L3 table 680 is associated with the IP address pattern 1.2.3.4 and is assigned a priority of B. A second entry in the L3 table 680 is associated with the IP address pattern 1.2.*.* and is assigned a priority of C. Because of the fixed priority of the L3 table 680, B is a higher priority than C. FIG. 6B further shows a case 690 of actions that result from adding a different new flow entry.

In case 690, a new flow entry associated with the IP address pattern 1.*.*.* with an assigned priority of D is to be added where the priority D is a higher priority than B and C. In case 690, the rule II.C.2.b is controlling. The 1.*.*.* IP address pattern overlaps with both the L3 table 610 entries. Adding the new 1.*.*.* entry to the L3 table 610 is not possible because the 1.*.*.* pattern has a lower priority than both the 1.2.3.4 and the 1.2.*.* patterns under the fixed priority rules of the L3 table 610. Consequently, the new 1.*.*.* entry should be added to the FP table (not shown) so that it may override the lower priority 1.2.3.4 and 1.2.*.* entries.

Some embodiments of the network device 100 may include non-transient, tangible, machine readable media that include executable code that when run by one or more processors may cause the one or more processors to perform the processes of methods 200 and/or 500 and/or implement the rules of FIG. 4 as described above. Some common forms of machine readable media that may include the processes of methods 200 and/or 500 and/or implement the rules of FIG. 4 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network device comprising:
   one or more controllers for controlling the network device;
   memory coupled to the one or more controllers;
   a first flow table for storing first flow entries, the first flow table implementing a fixed priority; and
   a second flow table for storing second flow entries that override the first flow entries, the second flow table implementing a flexible priority and being capable of storing the first flow entries;
   the one or more controllers being configured to:
      add a third flow entry with a first priority to the first table when the first priority is consistent with priorities of all first flow entries that overlap the third flow entry;
      move selected first flow entries that overlap the third flow entry to the second table and add the third flow entry to the first table when moving the selected first flow entries removes any priority inconsistencies in the first table when the third flow entry is added to the first table; and
      otherwise add the third flow entry to the second table.

2. The network device of claim 1 wherein the one or more controllers are further configured to:
   determine whether the third flow entry can only be stored in the second table; and
   when the third flow entry can only be stored in the second table:
      add the third flow entry to the second table; and
      move any first flow entries with priorities higher than the first priority that overlap the third flow entry to the second table.

3. The network device of claim 1 wherein the one or more controllers are further configured to determine whether the third flow entry can be stored in either the first table or the second table.

4. The network device of claim 3 wherein when the third flow entry can be stored in either the first table or the second table the one or more controllers are further configured to:
   determine whether the third flow entry matches a fourth flow entry selected from the first flow entries or the second flow entries, the fourth flow entry having a second priority;
   when the third flow entry matches the fourth flow entry:
      replace the fourth flow entry with the third flow entry when the first priority and the second priority are the same; and
      remove the fourth flow entry when the first priority and the second priority are different.

5. The network device of claim 3 wherein when the third flow entry can be stored in either the first table or the second table the one or more controllers are further configured to:
   determine whether the third flow entry overlaps any of the first flow entries and the second flow entries;
   select fourth flow entries from the first flow entries that overlap the third flow entry; and
   select fifth flow entries from the second flow entries that overlap the third flow entry.

6. The network device of claim 5 wherein when the third flow entry does not overlap any of the first flow entries or the second flow entries the one or more controllers are further configured to add the third flow entry to the first table.

7. The network device of claim 5 wherein when the third flow entry overlaps any of the first flow entries or the second flow entries the one or more controllers are further configured to determine whether the first priority is higher or equal to a priority of any flow entry selected from the fifth flow entries.

8. The network device of claim 7 wherein when the first priority is higher or equal to a priority of any flow entry selected from the fifth flow entries the one or more controllers are further configured to add the third flow entry to the second table.

9. The network device of claim 7 wherein when the first priority is lower than a priority of every flow entry selected from the fifth flow entries the one or more controllers are further configured to add the third flow entry to the first table when the first priority is consistent with a priority of every flow entry selected from the fourth flow entries.

10. The network device of claim 7 wherein when the first priority is lower than a priority of every flow entry selected from the fifth flow entries the one or more controllers are further configured to add the third flow entry to the second table when the first priority is not consistent with a priority of every flow entry selected from the fourth flow entries and the first priority is higher than the priority of every flow entry selected from the fourth flow entries.

11. The network device of claim 7 wherein when the first priority is lower than a priority of every flow entry selected from the fifth flow entries the one or more controllers are further configured to add the third flow entry to the first table and move any flow entry selected from the fourth flow entries with a priority inconsistent with the first priority to the second table.

12. The network device of claim 1 wherein the one or more controllers are further configured to:
   remove a fourth flow entry from either the first table or the second table;
   select a fifth flow entry with a second priority from the second flow entries, the fifth flow entry overlapping the fourth flow entry and the second priority being a lowest priority of any second flow entries that overlap the fourth flow entry;
   move the fifth flow entry to the first table when the first table can store the fifth flow entry and the second priority is consistent with a priority of every flow entry selected from the first flow entries that overlap the fourth flow entry.

13. The network device of claim 1 wherein the first table is a layer 3 (L3) table.

14. The network device of claim 1 wherein the first table is stored in a content addressable memory.

15. The network device of claim 1 wherein the second table is a flow processing (FP) table.

16. The network device of claim 15 wherein the second table is an OpenFlow FP table.

17. A method of adding a flow entry, the method comprising:
   adding a first flow entry with a first priority to a first table storing second flow entries when the first priority is consistent with priorities of all second flow entries that overlap the first flow entry;
   moving selected second flow entries that overlap the first flow entry to a second table storing third flow entries and adding the first flow entry to the first table when moving the selected second flow entries removes any priority inconsistencies in the first table when the first flow entry is added to the first table; and otherwise adding the first flow entry to the second table; wherein:

the first flow table implements a fixed priority;
the second flow table implements a flexible priority;
the third flow entries override the second flow entries; and
the second table is capable of storing the second flow entries.

18. The method of 17, further comprising:

determining whether the first flow entry can only be stored in the second table; and when the first flow entry can only be stored in the second table:

adding the first flow entry to the second table; and
moving any second flow entries with priorities higher than the first priority that overlap the first flow entry to the second table.

19. The method of 17, further comprising:

determining whether the first flow entry overlaps any of the second flow entries or the third flow entries;

selecting fourth flow entries from the second flow entries that overlap the first flow entry;

selecting fifth flow entries from the third flow entries that overlap the first flow entry;

adding the first flow entry to the first table when the first flow entry does not overlap any of the second flow entries and the third flow entries;

adding the first flow entry to the second table when the first priority is higher or equal to a priority of any flow entry selected from the fifth flow entries;

adding the first flow entry to the first table when the first priority is consistent with a priority of every flow entry selected from the fourth flow entries;

adding the first flow entry to the second table when the first priority is not consistent with a priority of every flow entry selected from the fourth flow entries and the first priority is higher than the priority of every flow entry selected from the fourth flow entries; and adding the first flow entry to the first table and moving any flow entry selected from the fourth flow entries with a priority inconsistent with the first priority to the second table when moving the selected fourth flow entries removes any priority inconsistencies in the first table when the first flow entry is added to the first table.

20. An information handling system comprising:

a network device;
one or more controllers for controlling the network device;
memory coupled to the one or more controllers;
a first flow table for storing first flow entries, the first flow table implementing a fixed priority; and
a second flow table for storing second flow entries that override the first flow entries, the second flow table implementing a flexible priority and being capable of storing the first flow entries;

the one or more controllers being configured to:

add a third flow entry with a first priority to the first table when the first priority is consistent with priorities of all first flow entries that overlap the third flow entry;

move selected first flow entries that overlap the third flow entry to the second table and add the third flow entry to the first table when moving the selected first flow entries removes any priority inconsistencies in the first table when the third flow entry is added to the first table; and otherwise add the third flow entry to the second table.

* * * * *